United States Patent [19]

Carlson et al.

[11] Patent Number: 5,042,250
[45] Date of Patent: Aug. 27, 1991

[54] HIGH-BACK PRESSURE POWER STEERING DEVICE

[75] Inventors: Keith R. Carlson, Big Lake; Dwight B. Stephenson, Savage; Timothy A. Hjelsand, Saint Louis Park, all of Minn.

[73] Assignee: Eaton Corporation, Cleveland, Ohio

[21] Appl. No.: 342,213

[22] Filed: Apr. 24, 1989

[51] Int. Cl.[5] ............................................... F16D 31/02
[52] U.S. Cl. ........................................ 60/384; 60/385; 60/455; 180/132
[58] Field of Search ........................ 60/384, 385, 455; 180/132

[56] References Cited

U.S. PATENT DOCUMENTS

| | | | |
|---|---|---|---|
| 3,478,648 | 11/1969 | D'Alba | 60/455 |
| 4,730,544 | 3/1988 | Jorgensen | 60/384 |
| 4,936,094 | 6/1990 | Novacek | 60/384 |

Primary Examiner—John T. Kwon
Assistant Examiner—F. Daniel Lopez
Attorney, Agent, or Firm—L. J. Kasper

[57] ABSTRACT

A hydrostatic power steering device is disclosed, which may be either a fluid controller (15) or a torque generator 111. The device is of the type including a housing (19;135) defining a fluid inlet port (29;113) and a return port (31;115). The device includes valve means (36;171) defining a neutral position and a first operating position. The device includes a gerotor mechanism (23;143) for imparting follow-up movement to the valve means in response to fluid flow through the gerotor, and a follow-up mechanism (49,51;183,185) transmits the follow-up movement to the valve means. The valve means defines a return fluid region (87,89,31g;205,197,157) which comprises part of the main fluid path. The return fluid region is isolated from the follow-up means and from the interior of the valving. The device includes a case drain port (99;219) in fluid communication with the interior of the valving such that the return port of the device may be connected to a downstream, pressurized device, while the interior of the valving (case drain region) is maintained at a relatively low pressure to avoid damage to seals (59;140) and bearings (57;142).

14 Claims, 5 Drawing Sheets

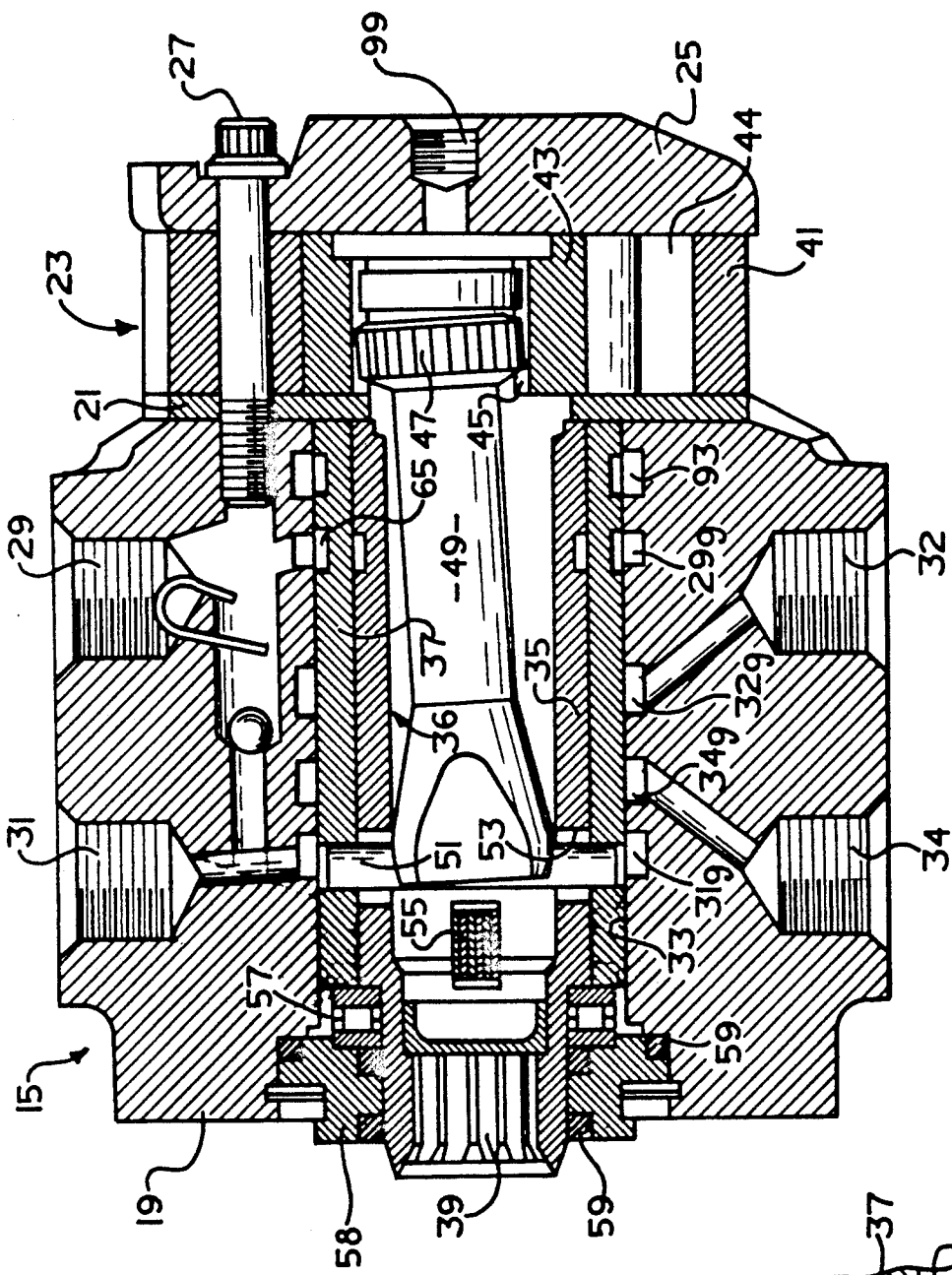
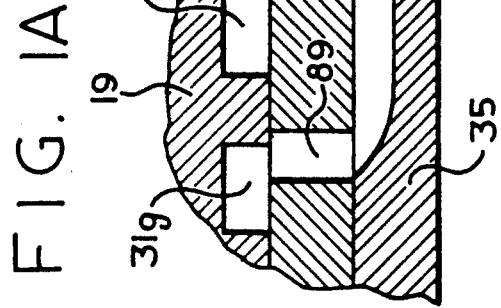
FIG. 1
FIG. 1A

HIGH-BACK PRESSURE POWER STEERING DEVICE

BACKGROUND OF THE DISCLOSURE

The present invention relates to hydrostatic power steering devices such as fluid controllers and torque generators, and more particularly, to such devices which are used in hydraulic circuits with other fluid pressure actuated devices.

Typical hydrostatic power steering devices include a housing defining inlet and return ports, some sort of fluid pressure displacement mechanism such as a gerotor gear set, and valving to control the flow of fluid from the inlet port through the gerotor to the return port, in response to rotation of a steering wheel. In the typical, prior art device, leakage fluid within the device (e.g., fluid leaking from the gerotor) collects in the interior or case drain region of the device, and then is communicated through the valving to the return port of the device from where it returns to the system reservoir. Such devices also typically include bearings and seals disposed between the housing and valve means, with the bearings and seals being subjected to the fluid pressure in the case drain.

In many vehicle hydraulic circuits which include hydrostatic power steering devices, it is desirable to include additional fluid pressure actuated devices (such as a garden implement or winch) in the same circuit so that only a single pump is required, but disposed downstream of the steering device, so that the steering device always has priority. It is most desirable to connect such a downstream, auxiliary device to the return port of the steering device, which greatly simplifies the circuit plumbing, as well as the steering device. Unfortunately, if the auxiliary device operates on a pressure differential such as 1,000 psi or more, the result is, with prior art steering devices, that there will be 1,000 psi back pressure present in the return port of the steering device, which is acceptable, but also there will be 1,000 psi present in the case drain, which is not acceptable, primarily because the bearings and seals would be exposed to such a pressure.

SUMMARY OF THE INVENTION

Accordingly, it is an object of the present invention to provide an improved hydrostatic steering device which may be connected in a series flow relationship with a downstream fluid pressure actuated device while isolating the case drain region, and the bearings and seals, from relatively high back pressures.

It is a more specific object of the present invention to provide an improved hydrostatic power steering device which accomplishes the above-stated object, by isolating, within the valving of the device, the main fluid path from the case drain region, and providing a separate case drain port in fluid communication with the case drain region.

The above and other objects of the present invention are accomplished by the provision of an improved hydrostatic power steering device operable to control the flow of fluid from a source of fluid, the device being of the type including housing means defining a fluid inlet port for connection to the source, and a return port. Valve means is disposed in the housing means and defines a neutral position and a first operating position. The housing means and the valve means cooperate to define a main fluid path communicating between the inlet port and the return port when the valve means is in the first operating position. A fluid actuated means for imparting follow-up movement to the valve means in response to flow of fluid through the fluid actuated means is included, the fluid actuated means being disposed in series flow relationship in the main fluid path between the inlet port and the return port. The valve means comprises a generally cylindrical primary, rotatable valve member defining an interior, and a relatively rotatable, follow-up valve member. The fluid actuated means is operable to return the follow-up valve member to the neutral position, relative to the primary valve member. The fluid actuated means includes follow-up means operable to transmit the follow-up movement to the valve means, the follow-up means including a member extending radially through an opening in the primary valve member and engaging follow-up valve member. The primary and follow-up valve members cooperate to define a return fluid region comprising a part of the main fluid path.

The improved hydrostatic power steering device is characterized by the return fluid region being isolated from the opening of the primary valve member and from the interior of primary valve member. The power steering device defines a case drain port in fluid communication with the interior of the primary valve member.

BRIEF DESCRIPTION OF THE DRAWINGS

FIG. 1 is an axial cross-section of a fluid controller of the type with which the present invention may be utilized.

FIG. 1A is an enlarged, fragmentary view similar to FIG. 1, but on a different plane, illustrating one aspect of the present invention.

DESCRIPTION OF THE PREFERRED EMBODIMENT

Figure 2:
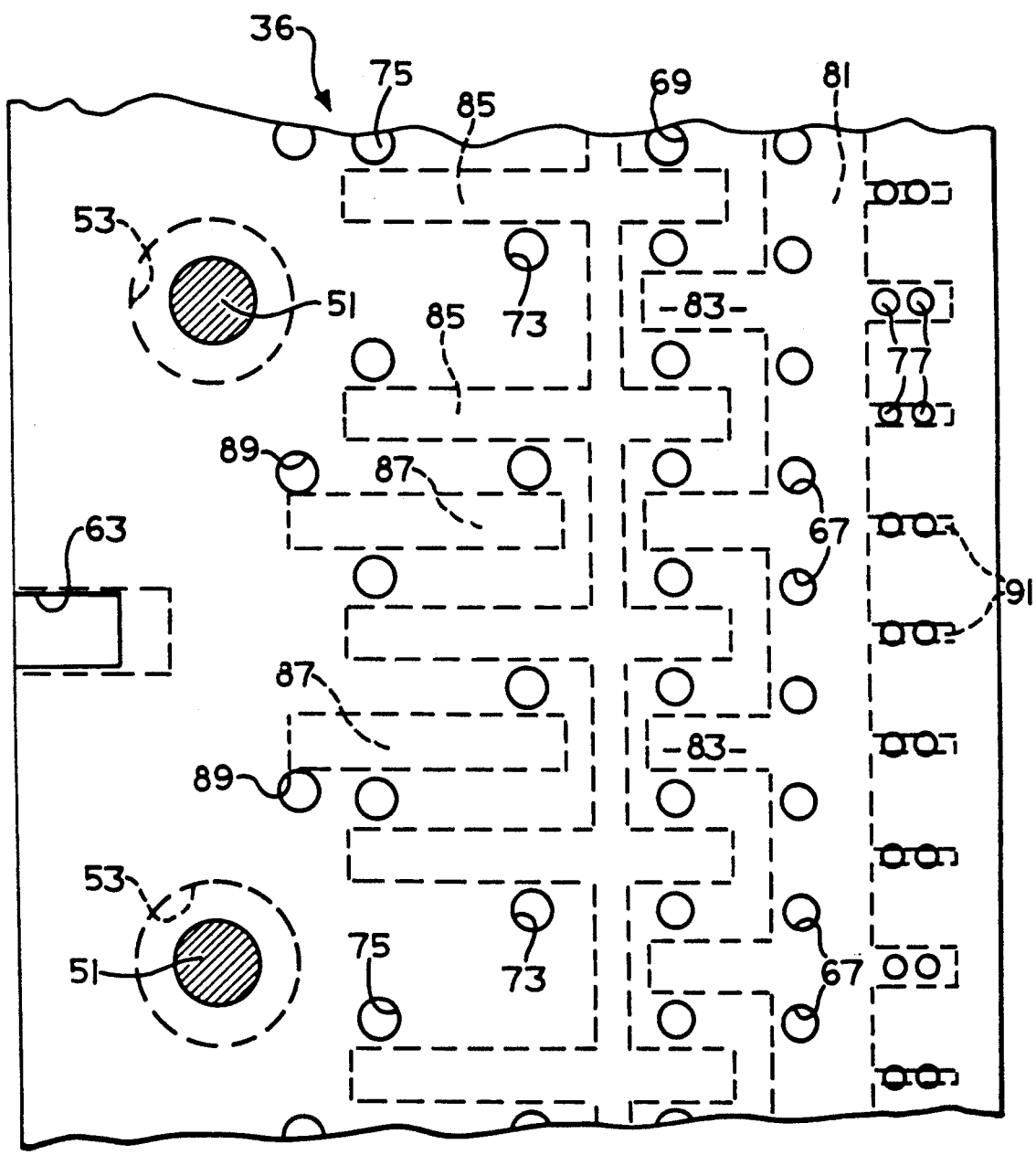
FIG. 2 is an enlarged, fragmentary, overlay view of the valving used in the fluid controller shown in FIG. 1, with the valving in the neutral position.

Referring now to the drawings, which are not intended to limit the present invention, FIG. 1 illustrates a steering control valve, generally designated 15, of the type with which the present invention may be used. The steering control valve 15 (controller) directs the flow of pressurized fluid to either the right end or the left end of a power steering cylinder (not shown) in response to rotation of a vehicle steering wheel (also not shown) in the appropriate direction.

The controller 15 may be seen in greater detail, and its operation better understood, by reference to U.S. Pat. No. 3,819,307 which is assigned to the assignee of the present invention, and incorporated herein by reference. The controller 15 is comprised of several sections, including a valve housing 19, a port plate 21, a fluid meter 23, and an end plate 25. These sections are held together in tight sealing engagement by means of a plurality of bolts 27 which are in threaded engagement with the housing 19.

The housing 19 defines a fluid inlet port 29, a fluid return port 31, and a pair of control fluid ports 32 and 34 which would be connected to the opposite ends of the steering cylinder. The housing 19 further defines four annular grooves 29g, 31g, 32g, and 34g, which are in open, relatively unrestricted fluid communication with the fluid ports 29, 31, 32, and 34, respectively.

Rotatably disposed within a valve bore 33 defined by the housing 19 is valving, generally designated 36, which comprises a primary, rotatable valve member 35 (spool) and a cooperating, relatively rotatable follow-up valve member 37 (sleeve). The forward end of the spool 35 includes a portion having a reduced diameter and defining a set of internal splines 39 which provide for a direct mechanical connection between the spool 35 and the steering wheel. The spool 35 and sleeve 37 will be described in greater detail subsequently.

The fluid meter 23, in the subject embodiment, comprises a gerotor gear set including an internally toothed stator 41 and an externally toothed rotor 43, which is eccentrically disposed within the stator 41, such that orbital and rotational movement of the rotor 43 within the stator 41 defines a plurality of expanding and contracting fluid volume chambers 44. The rotor 43 defines a set of internal splines 45, and in splined engagement therewith is a set of external splines 47, formed at the rearward end of a drive shaft 49. The shaft 49 has a bifurcated forward end permitting driving connection between the shaft 49 and the sleeve 37 by means of a pin 51 passing through a pair of circular pin openings 53 in the spool 35. Thus, pressurized fluid flowing through the valving in response to the turning of the spool 35 flows to the fluid meter 23 causing orbital and rotational movement of the rotor 43 (metering member) within the stator 41, as the fluid flows through the expanding and contracting fluid volume chambers 44, causing the orbital and rotational movement of the rotor 43. Such movement of the rotor 43 causes follow-up movement of the sleeve 37 by means of the drive shaft 49 and pin 51, to maintain an appropriate relative displacement between the spool 35 and sleeve 37, for any particular rate of rotation of the steering wheel.

A plurality of leaf springs 55, extending through spring openings in the spool 35, urges the sleeve 37 toward the neutral position, relative to the spool 35. Disposed adjacent the forward end of the sleeve 37, and radially between the reduced diameter portion of the spool 35 and the housing 19, is a thrust bearing set 57, which accommodates axial forces applied to the spool and sleeve. Disposed forwardly of the bearing set 57 is a retainer member 58, on which is seated three seals 59.

Referring now to FIG. 2, the valving 36 may be seen in greater detail, although the reference numerals 35 and 37 do not appear in FIG. 2, because FIG. 2 is an overlay view, in which the various parts defined by the spool are shown in dashed lines, and the various parts defined by the sleeve are shown in solid lines. It should be noted that in FIG. 2, the spool 35 and sleeve 37 are shown in their proper relative axial position, i.e., the right end surface of both lie in the same plane. In addition, the spool 35 and sleeve 37 are shown in their proper relative rotational position to define therebetween the neutral condition.

The sleeve 37 defines a pair of diametrically-opposed openings 63 (only one of which is shown in FIG. 2) through which the leaf springs 55 extend radially outwardly. The sleeve 37 defines an annular groove 65 (shown only in FIG. 1) disposed axially to be in continuous fluid communication with the annular groove 29g. Disposed in fluid communication with the groove 65 is a plurality of ports 67. To the left of the annular groove 65 is a plurality of meter ports 69 which communicate between the valving and the expanding and contracting volume chambers of the fluid meter 23 by means of a plurality of axial bores 71 defined by the housing 19 (shown only in FIG. 3). Disposed to the left of the meter ports in FIG. 2 is a plurality of cylinder ports 73 and a plurality of cylinder ports 75 disposed such that when the ports 73 communicate metered fluid to one end of the steering cylinder, the ports 75 receive return fluid from the opposite end of the cylinder. Disposed to the right of the ports 67, the sleeve 37 defines a plurality of pairs of radial open center holes 77, the function of which will be described in greater detail subsequently.

Referring still to FIG. 2, the spool 35 defines an annular groove 81, and in communication therewith, a plurality of axial slots 83. The valving shown in FIG. 2 is referred to as being of the "open center" type because each of the ports 67 is in continuous, open communication with the annular groove 81, and because the valving defines an open flow path to the return port 31, when the valving is in the neutral position shown in FIG. 2, as will be described in greater detail subsequently. Each of the axial slots 83 communicates with one of the meter ports 69 to define therebetween a variable orifice, the composite of these individual variable orifices comprising a variable flow control orifice, generally referred to as the A2 orifice. As is generally well known to those skilled in the art, in an open center controller, there is no true A1 orifice. Metered fluid returning from the fluid meter 23 flows through alternate ones of the meter ports 69 and enters an adjacent axial slot 85. The communication between the alternate meter ports 69 and each axial slot 85 defines a variable orifice, the composite of these individual orifices comprising a variable flow control orifice, generally referred to as the A3 orifice. The axial slots 85 communicate with either the adjacent cylinder ports 73, or the adjacent cylinder ports 75, depending upon the direction of rotation of the steering wheel, as is well known to those skilled in the art. The communication between each of the axial slots 85 and the adjacent cylinder port (73 or 75), defines therebetween a variable orifice, the composite of these individual orifices comprising a variable flow control orifice, generally referred to as the A4 orifice.

For either direction of rotation of the steering wheel, fluid returning from the cylinder through whichever of the cylinder ports 73 or 75 flows through the respective axial slots 87. In a right turn condition, by way of example only, each of the cylinder ports 75 communicates with the adjacent axial slot 87 to define therebetween a variable orifice, the composite of these individual orifices comprising a variable return flow control orifice, generally referred to as the A5 orifice.

In conventional controllers made in accordance with the prior art, return fluid would flow through the axial slots 87 into tank ports located in the sleeve 37, and typically, there would be one of the axial slots 87 extending axially into each of the pin openings 53 defined by the spool 35. Return fluid would flow from the tank ports through the annular groove 31g to the fluid return port 31. From there it would flow back to the system reservoir. The above-described flow path are typically referred to as the main fluid path of the controller.

Also in accordance with the teachings of the prior art, leakage fluid in the interior of the controller (inside the spool 35) would flow radially outward through the pin openings 53 and spring openings 63, and combine with the return fluid in the axial slots 87, flowing to the return port 31, as described previously. As was described in the background of the present specification, the bearings 57 and seals 59 are subjected to the pressure of the return fluid, because of such open communication with the interior (case) of the controller.

Thus, it has not been possible with conventional controllers to connect the return port 31 to the inlet of another fluid pressure device, in a downstream, series relation to the controller, because of the possibility of damage to the bearings and seals caused by the relatively high fluid pressure needed to operate the downstream device.

It is an important aspect of the present invention to isolate the return fluid flow in the main fluid path from the case drain (or leakage) fluid, typically present in the interior of the controller. Referring again to FIG. 2, it may be seen that, in the subject embodiment of the invention, none of the axial slots 87 communicates with the pin openings 53. Instead, each of the axial slots 87 is in a position to communicate with a tank port 89, defined by the sleeve 37, depending upon the direction of rotation of the spool, relative to the sleeve. Referring now also to FIG. 1A, it may be seen that the axial position of the tank ports 89 is such as to provide relatively unrestricted communication between each tank port 89 and the annular groove 31g which communicates with the return port 31. Thus, the return fluid flow in the main fluid path is isolated from the controller case because of the absence of communication between the axial slots 87 and the pin openings 53.

Referring again primarily to FIG. 2, toward the right end of the valving, the spool 35 defines a plurality of axial slots 91, in open communication with the annular groove 81. In the subject embodiment, some of the axial slots 91 are relatively narrower, and others are relatively wider, for reasons unrelated to the present invention. When the spool 35 is in its neutral position, relative to the sleeve 37, each of the axial slots 91 is circumferentially aligned with one of the pairs of open-center holes 77. As is well known to those skilled in the art, for a controller to be of the "open-center" type, there must be a relatively unrestricted flow path communicating between the inlet port 29 and the return port 31, when the valving is in neutral. The communication between each of the axial slots 91 and the respective pair of open-center holes 77 defines therebetween a variable orifice, the composite of these individual orifices comprising a variable, neutral flow control orifice, generally referred to as the $A_N$ orifice. As the valving is displaced from the neutral position, the open-center fluid path (and the $A_N$ orifice) is gradually restricted, and the main fluid path is gradually opened.

In conventional prior art controllers of the open-center type, the open-center flow would be directed from the inlet port, through the sleeve and then through aligned openings in the spool, and into the interior (case), from where the open-center fluid would flow to the return port, as described previously.

Figure 3:
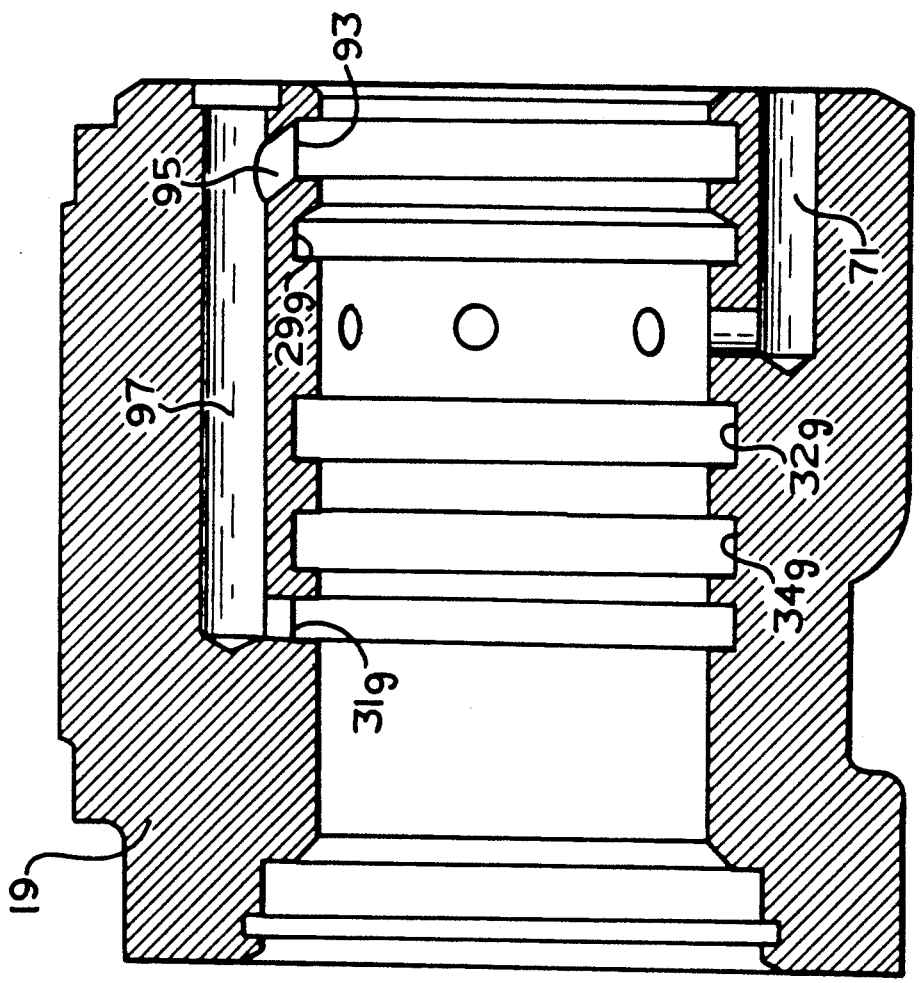
FIG. 3 is an axial cross-section, similar to FIG. 1 and on the same scale as FIG. 1, showing only the housing of the controller, but on a plane different than that shown in FIG. 1.

It is an important aspect of the present invention that the open-center fluid path does not flow into the case and is isolated therefrom. Instead, referring now to FIG. 3, it may be seen that the valve housing 19 defines an annular groove 93, disposed to the right of the annular groove 29g. The annular groove 93 is connected by means of an angled bore 95 to an elongated, drilled passage 97, which is in open fluid communication with the annular groove 31g, communicating with the return fluid port 31. In the subject embodiment, the valve housing 19 defines a plurality of threaded portions, disposed to receive the bolts 27. One of the threaded portions is extended, as shown in FIG. 3 to provide the passage 97, and the bolt 27 is either omitted or shortened. Therefore, with the valving in the neutral position, fluid flows from the annular groove 81 through each of the axial slots 91, then through the pairs of open-center holes 77 into the annular groove 93 defined by the valve housing 19. This open-center fluid then flows through the angled bore 95, through the passage 97, into the annular groove 31g and then to the return fluid port 31. If the return port 31 is connected to a downstream, pressurized device, the resulting "back pressure" is communicated from the inlet port 29 of the controller through the open-center fluid path just described, and then through the return port 31 to the downstream device, without subjecting either the bearings 57 or seals 59 to such back pressure.

Referring again primarily to FIG. 1, it is another aspect of the present invention that, in order to isolate the return fluid and open-center fluid from the case drain fluid, there is provided a case drain port, for connection to an external case drain line, which would be in relatively unrestricted fluid communication with the system reservoir. As a result, the case of the controller would be kept at a relatively low pressure, and the bearings 57 and seals 59 would be subjected only to such relatively low, case pressure. By way of example only, in the subject embodiment, the end plate 25 defines a case drain port 99, which is in relatively unrestricted fluid communication with the entire case drain region of the controller. As is well known to those skilled in the art, the case drain fluid disposed in the interior of the controller is primarily leakage fluid, i.e., fluid which has leaked along the end faces of the rotor 43, or which has leaked from between the spool 35 and sleeve 37, between the ends thereof and the port plate 21.

Although the present invention has been illustrated in connection with an open-center controller, it should be understood that the invention is equally applicable to both closed-center and load-sensing controllers. However, in either a closed-center or load-sensing controller, the axial slots 91 and open-center holes 77 would be omitted, as would the annular groove 93, angled passage 95, and passage 97. In the case of a load-sensing controller, the items just mentioned would be replaced by the typical, well known structure for communicating a load signal from the valving 36 to a load signal port. As is well known in the art, it is necessary to provide a means to drain the load signal when the valving 36 is in the neutral position. In a load-sensing version of the present invention, the load signal could be drained, with the valving in neutral to either the return port 31 by means of structure of the type shown in FIG. 3, or could be drained to the case drain port 99, by draining the load signal to the interior of the spool, in the conventional manner.

Alternative Embodiment

Figure 4:
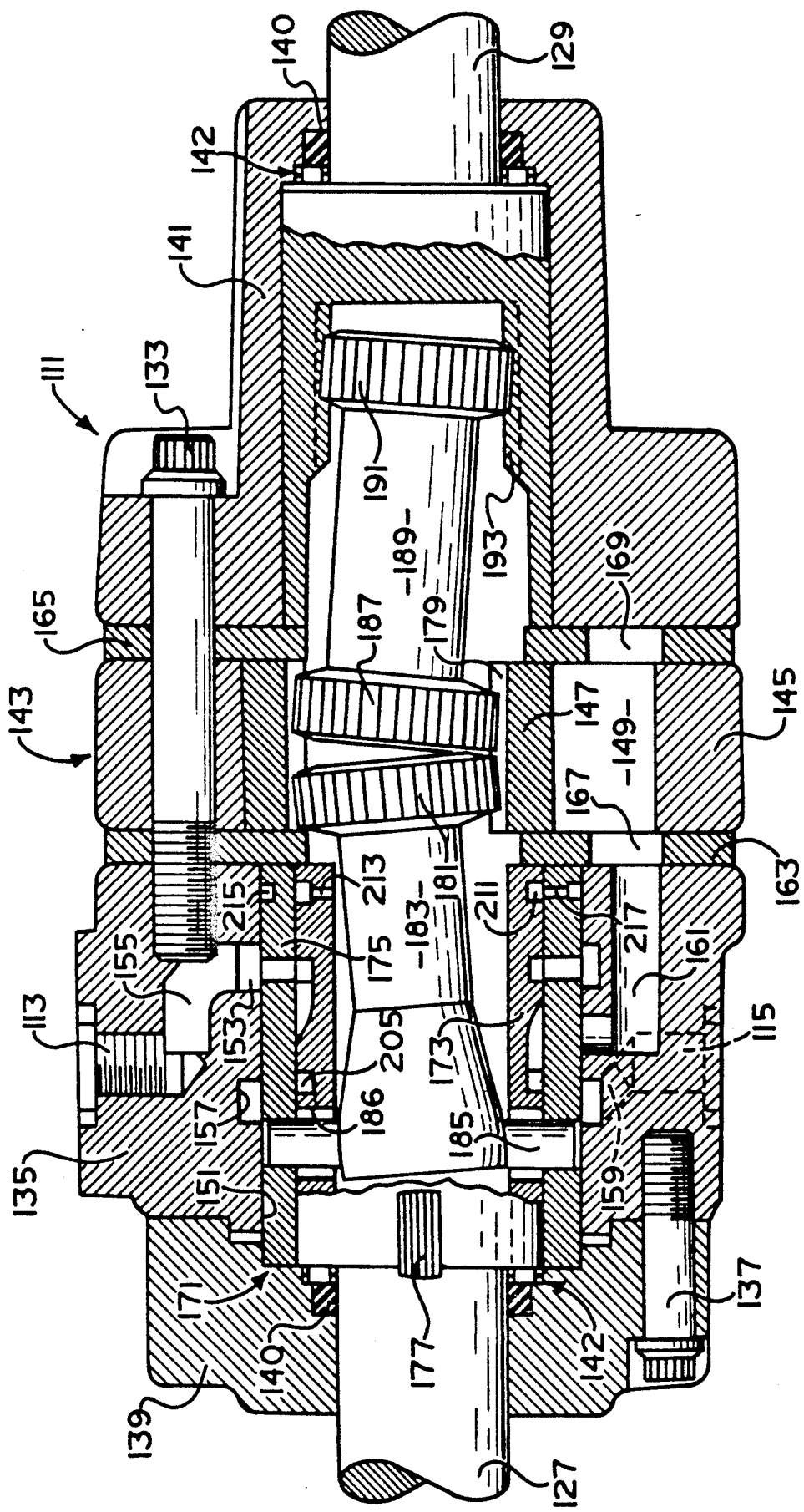
FIG. 4 is an axial cross-section of a torque generator of the type which may utilize the present invention.
Figure 5:
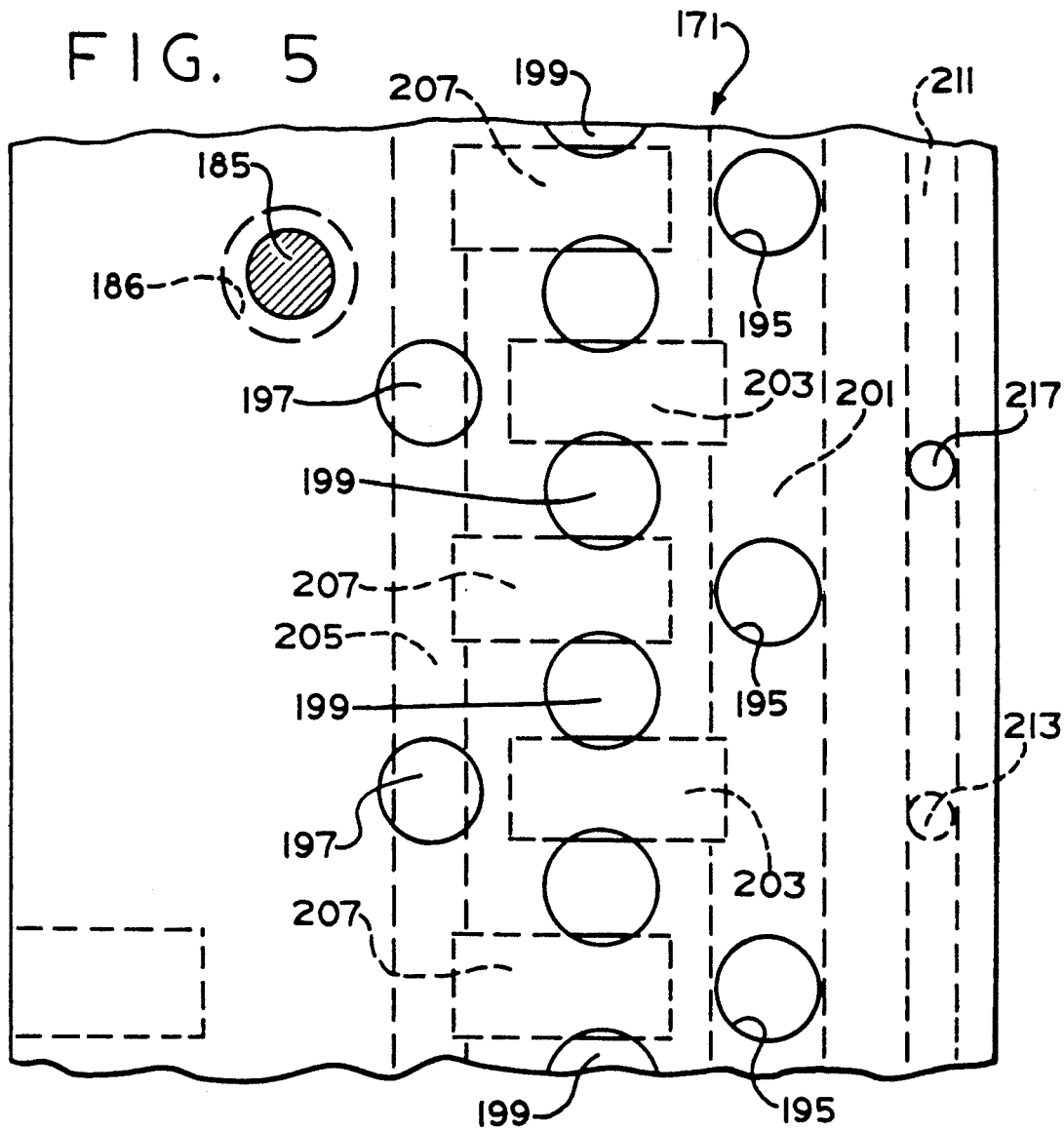
FIG. 5 is an enlarged, fragmentary, overlay view of the valving of the torque generator shown in FIG. 4.
Figure 6:
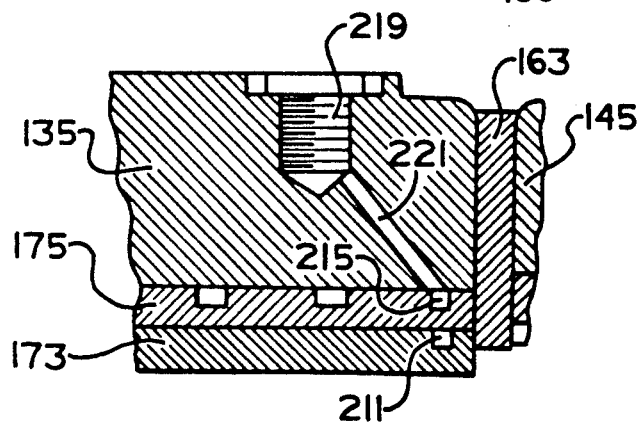
FIG. 6 is a fragmentary view similar to FIG. 4, but on a different plane than FIG. 4.

Referring now to FIGS. 4-6, FIG. 4 illustrates a an alternative embodiment of the present invention, which is a torque-generating steering device, generally designated 111 and referred to hereinafter simply as a "torque generator". The torque generator 111 defines an inlet port 113 and an outlet port 115, which is connected to a system reservoir. The inlet port 113 is typically in fluid communication with an outlet port of a hydraulic pump.

The torque generator 111 includes an input shaft 127 and an output shaft 129. Operably connected to the input shaft 127 is a steering wheel (not shown), whereby a relatively low-torque input is transmitted to the torque generator 111. As is well known to those skilled in the art, the primary function of the torque generator 111 is to receive the relatively low-torque input, and convert that input into a relatively high-torque steering output, which is transmitted by means of the output shaft 129 to any suitable device such as the pinion gear of a rack and pinion steering apparatus (not shown).

Referring still to FIG. 4, the torque generator 111 is comprised of a plurality of sections held in tight sealing engagement by a plurality of bolts 133, only one of which is shown in FIG. 4. The torque generator comprises a valve housing section 135, having attached thereto, by means of a plurality of bolts 137, a front endcap 139, through which the input shaft 127 extends. Disposed between the input shaft 127 and the endcap 139 is a seal member 140, the function of which is to prevent the leakage of fluid from the interior of the torque generator 111, along the shaft 127, to the exterior. Disposed adjacent the seal member 140 is a thrust bearing 142.

At the rearward end of the torque generator 111 (right end in FIG. 4) is a shaft support casing 141, through which the output shaft 129 extends. Disposed between the output shaft 129 and the casing 141 is another seal member 140, and adjacent thereto another thrust bearing 142. Disposed between the valve housing section 135 and the shaft support casing 141 is a gerotor displacement mechanism, generally designated 143, comprising an internally-toothed ring member 145 and an externally-toothed star member 147. As is well known to those skilled in the art, but by way of example only, the ring member 145 has a plurality N+1 of internal teeth, and the star member 147 is eccentrically disposed within the ring member 145 and has a plurality N of external teeth. The star member 147 orbits and rotates within the ring member 145, and this relative orbital and rotational motion defines a plurality of expanding and contracting fluid volume chambers 149. In the subject embodiment, N is equal to 6, such that the ring member 145 has seven internal teeth, and the star member 147 has six external teeth, such that six orbits of the star within the ring results in one complete revolution of the star.

Referring still to FIG. 4, the valve housing section 135 defines the inlet port 113, as well as the outlet port 115. The housing section 135 defines a cylindrical valve bore 151, and further defines an annular groove 153, which is in fluid communication with the inlet port 113 by means of a passage 155. Similarly, the housing section 135 defines an annular groove 157, which is in open fluid communication with the outlet port 115 by means of a passage 159, shown only in dotted form in FIG. 4. Finally, the housing section 135 defines a plurality of meter passages 161 each of which is disposed for fluid communication with one of the volume chambers 149.

Disposed between the gerotor 143 and the valve housing section 135 is a port plate 163, and disposed between the gerotor 143 and the shaft support casing 141 is another port plate 165. The port plate 163 defines a plurality of ports 167, each of which is disposed to permit fluid communication between one of the volume chambers 149 and its respective meter passage 161. In the subject embodiment, the port plate 165 defines a plurality of recesses 169 which may be substantially identical to the ports 167, to provide axial pressure balancing of the star member 147, as is well known to those skilled in the art.

Disposed within the valve bore 151 is a valve means, generally designated 171, comprising a primary, rotatable valve member 173 (spool), and a relatively rotatable, follow-up valve member 175 (sleeve). The spool valve 173 is preferably formed integral with the input shaft 127, for rotation therewith. Passing through the wall of the spool 173, and into engagement with the sleeve 175 is a plurality of spring members 177, the function of which is to bias the sleeve 175 toward a neutral position, relative to the spool 173, with the term "neutral" to be described in greater detail subsequently in connection with FIG. 5.

The gerotor displacement mechanism 143 has two primary functions in the torque generator 111. The first is to serve as a fluid meter, in response to the flow of pressurized fluid therethrough, and provide follow-up movement to the sleeve 175. In order to accomplish this follow-up function, the star member 147 is provided with a set of internal splines 179, and in engagement therewith is a set of crowned, external splines 181 formed about the rearward end of a driveshaft 183, the forward end of which is bifurcated and engages a pin member 185. The pin member 185 extends through oversized pin openings 186 in the spool 173, in a manner well known in the art, and is received within openings in the sleeve 175, such that orbital and rotational motion of the star 147 is transmitted into follow-up rotation of the sleeve 175.

The other function of the gerotor mechanism 143 is to transmit a high-torque output to the output shaft 129. In order to accomplish this function, there is, in engagement with the internal splines 179 a set of crowned external splines 187 formed about one end of a main driveshaft 189 having, at its rearward end, another set of crowned external splines 191. The splines 191 are in engagement with a set of straight, internal splines 193 defined within the output shaft 129. Therefore, orbital and rotational movement of the star 147, in response to the flow of pressurized fluid through the gerotor 143, results in a relatively high-torque rotation of the output shaft 129.

Referring now to FIG. 5, the sleeve 175 defines a plurality of pressure ports 195, which are positioned axially to be in continuous fluid communication with the annular groove 153 in the housing 135, and therefore, with the inlet port 113. The sleeve valve 175 also defines a plurality of return ports 197 which are in continuous fluid communication with the annular groove 157, and therefore, with the outlet port 115. Finally, the sleeve valve 175 defines a plurality of meter ports 199, each of which is disposed to be in commutating fluid communication with the opening of each of the meter passages 161 into the valve bore 151. In the subject embodiment, because there are seven (N+1) of the volume chambers 149, and therefore seven of the meter passages 161, there are 12 (two times N) of the meter ports 199.

Referring still to FIG. 5, the spool 173 defines an annular groove 201, and in open communication therewith is a plurality of axial slots 203. Toward the forward end (left end in FIG. 5), the spool 173 defines another annular groove 205, and in open communication therewith, a plurality of axial slots 207.

It should be noted that the structure described thus far is generally well known in the torque generator art.

Referring now still to FIG. 5, the operation of the torque generator 111 of the present invention will be described. When the vehicle operator rotates the steering wheel in a clockwise direction, the spool 173 is rotated clockwise, relative to the sleeve 175, from the neutral position shown in FIG. 5 to an operating position wherein the valve housing section 135, sleeve 175, and spool 173 cooperate to define a fluid path which flows from the inlet port 113 through the gerotor 143 to the outlet port 115.

When the spool 173 is rotated to the operating position, in 05 response to a relatively low-torque input to the input shaft 127, with the pressure ports 195 in communication with the axial slots 203, the pressurized fluid in the axial slot 203, flows into the adjacent meter ports 199, with the cumulative area of overlap of those meter ports 199 and the axial slots 203 providing a variable flow control orifice. The fluid which flows through the flow control orifice is then communicated through successive meter passages 161 to the expanding volume chambers 149 of the gerotor 143. This flow of pressurized fluid to the expanding volume chambers causes orbital and rotational motion of the star 147, which is then transmitted by means of the main drive shaft 189 into a relatively high-torque steering output of the output shaft 129.

Fluid which is exhausted from the contracting volume chambers 149 of the gerotor 143 is communicated back through successive meter passages 161 to those meter ports 199 which are in communication with the axial slots 207. The cumulative overlap of these particular meter ports 199 and the axial slots 207 provides a second variable flow control orifice. After flowing through the second flow control orifice, the low-pressure exhaust fluid flows through the axial slots 207 into the annular groove 205, then flows through the return ports 197. As is well known to those skilled in the art, rotation of the steering wheel at a relatively constant speed and torque will achieve a certain displacement of the spool 173, relative to the sleeve 175, and the flow through the gerotor 143, and resulting follow-up movement transmitted to the sleeve 175 by means of the drive shaft 183 and pin 185, will maintain the relative displacement of the spool and sleeve.

In accordance with the present invention, the annular groove 205, which contains return fluid, is isolated from the case drain region of the torque generator 111. This is accomplished primarily by preventing fluid communication between the pin openings 186 and the annular groove 205, similar to what was done in the embodiment of FIGS. 1-3, wherein the axial slots 87 were prevented from communicating with the pin openings 53.

Referring now to FIG. 6, in conjunction with FIGS. 4 and 5, an additional aspect of the present invention will be described. The spool 173 defines an annular groove 211, disposed toward the right end of the spool 173 in FIG. 6. The spool 173 also defines at least one radial bore 213, to provide communication between the case (interior of spool 173) and the annular groove 211. The sleeve 175 defines an annular groove 215 which, preferably, is axially aligned with the annular groove 211. The sleeve 175 further defines at least one radial bore 217 which provides communication between the annular groove 211 and the annular groove 215.

The valve housing 135 defines a case drain port 219 which, in the subject embodiment, opens at the same port face as does the inlet port 113. The valve housing 135 further defines an angled passage 221 which provides relatively unrestricted communication between the annular groove 215 and the case drain port 219. Therefore, as the case drain pressure within the torque generator 111 increases, the pressure is relieved by means of a flow of fluid from the case drain, through the radial bore 213 into the annular groove 211, then through the radial bore 217 into the annular groove 215, and then through the angled passageway 221 to the case drain port 219.

As was mentioned in connection with the FIG. 1 embodiment, the present invention may be utilized with a torque generator, which is either closed-center or load-sensing, although the invention has been described in connection with an open-center version. If the invention is utilized in conjunction with a load-sensing torque generator, it would be necessary to utilize a port such as the port 219 shown in FIG. 6 as a load-signal port, and the other structure shown in FIG. 6 would be utilized to transmit the load signal to the load signal port. It would then be necessary to locate the case drain port elsewhere in the torque generator. By way of example only, the case drain port could be located in the shaft support casing 141, in continuous fluid communication with the case drain region of the torque generator by means of appropriate grooves and passages in the casing 141 and the lefthand, annular portion of the output shaft 129.

In connection with both the FIG. 1 embodiment and the FIG. 4 embodiment of the present invention, those skilled in the art will recognize that there may be some leakage of pressurized fluid from the return port back past the pin 51 or 185 and into the case drain. However, the relatively close fit normally utilized between the pin 51 or 185 and the sleeve 37 or 175, respectively, will permit only a very small amount of leakage past the pin to the case drain region. Such leakage should not detract from the ability of the controller 15 or torque generator 111 to be used in a circuit with a downstream fluid pressure device connected to the return port 31 or 115, respectively, while at the same time, keeping the case drain at a sufficiently low pressure (just above reservoir pressure) to avoid problems with the seals and bearings.

The invention has been described in great detail, sufficient to enable one skilled in the art to make and use the same. Various alterations and modifications of the invention will occur to those skilled in the art upon a reading and understanding of the foregoing specification, and it is intended to include all such alterations and modifications as part of the invention, insofar as they come within the scope of the appended claims.

We claim:

1. A hydrostatic power steering device operable to control the flow of fluid from a source of fluid; said device being of the type including housing means defining a fluid inlet port for connection to the source of fluid, and a return port; valve means disposed in said housing means and defining a neutral position and a first operating position; said housing means and said valve means cooperating to define a main fluid path communicating between said inlet port and said return port when said valve means is in said first operating position; fluid actuated means for imparting follow-up movement to said valve means in response to the flow of fluid through said fluid actuated means, said fluid actuated means being disposed in series flow relationship in said main fluid path between said inlet port and said return port; said valve means comprising a generally cylindrical primary, rotatable valve member defining an interior, and a relatively rotatable, follow-up valve member; said fluid actuated means being operable to return said follow-up valve member to said neutral position, relative to said primary valve member; said fluid actuated means including follow-up means operable to transmit said follow-up movement to said valve means, said follow-up means including a member extending radially through an opening in said primary valve member and engaging said follow-up valve member; said primary and follow-up valve members cooperating to define a return fluid region, said return fluid region comprising a part of said main fluid path; characterized by:

(a) said return fluid region being isolated from said opening of said primary valve member and from said interior of said primary valve member; and (b) said power steering device defining a case drain port in fluid communication with said interior of said primary valve member.

2. A hydrostatic power steering device as claimed in claim 1 characterized by said device including seal means disposed between said housing means and said primary valve member, said seal means being exposed to fluid pressure in said interior of said primary valve member.

3. A hydrostatic power steering device as claimed in claim 2 characterized by said device further including bearing means disposed between said housing means and said valve means, said bearing means being exposed to fluid pressure in said interior of said primary valve member.

4. A hydrostatic power steering device as claimed in claim 1 characterized by said follow-up valve member comprising a generally cylindrical valve member disposed radially between said primary valve member and said housing means.

5. A hydrostatic power steering device as claimed in claim 4 characterized by said housing means defining a plurality of meter passages providing fluid communication between said valve means and said fluid actuated means, said housing means defining a generally cylindrical valve bore adapted to receive said follow-up valve member therein, said plurality of meter passages being in open communication with said valve bore at a plurality of circumferentially disposed locations.

6. A hydrostatic power steering device as claimed in claim 5 characterized by said fluid actuated means comprising a fluid displacement means including a rotatable member, said follow-up means transmitting rotational movement of said rotatable member to said follow-up valve member.

7. A hydrostatic power steering device as claimed in claim 6 characterized by said fluid displacement means including a member having orbital movement, said fluid displacement means defining expanding and contracting fluid volume chambers in response to said orbital and rotational movements, each of said plurality of meter passages being in fluid communication with one of said fluid volume chambers.

8. A hydrostatic power steering device as claimed in claim 5 characterized by said follow-up valve member defining a plurality of meter ports, disposed to be in commutating fluid communication with said plurality of meter passages in response to rotation of said follow-up valve member.

9. A hydrostatic power steering device as claimed in claim 8 characterized by said primary and follow-up valve members cooperating to define an inlet fluid region, said primary valve member defining a first plurality of axial slots being disposed to provide fluid communication from said inlet fluid region to said meter ports when said valve means is in said first operating position.

10. A hydrostatic power steering device as claimed in claim 9 characterized by said primary valve member further defining a second plurality of axial slots being disposed to provide fluid communication from said meter ports to said return fluid region when said valve means is in said first operating position, said second plurality of axial slots being blocked from substantial fluid communication with said opening in said primary valve member.

11. A hydrostatic power steering device as claimed in claim 9 Characterized by said housing means defining first and second control fluid ports for connection to a fluid pressure operated device, said follow-up valve member defining a first plurality of cylinder ports in fluid communication with said first control fluid port and a second plurality of cylinder ports in fluid communication with said second control fluid port.

12. A hydrostatic power steering device as claimed in claim 11 characterized by said primary valve member further defining a second plurality of axial slots being disposed to provide fluid communication from said meter ports to said first plurality of cylinder ports, and a third plurality of axial slots being disposed to provide fluid communication from said second plurality of cylinder ports to said return fluid region when said valve means is in said first operating position, said third plurality of axial slots being blocked from substantial fluid communication with said opening in said primary valve member.

13. A hydrostatic power steering device as claimed in claim 9 characterized by said primary and follow-up valve members cooperating to define an open center fluid path in continuous fluid communication with said inlet fluid region, said open center fluid path including a variable neutral orifice having its maximum flow area when said valve means is in said neutral position, and a decreasing flow area as said valve means is displaced toward said first operating position.

14. A hydrostatic power steering device as claimed in claim 13 characterized by said housing means defining passage means providing fluid communication between said open center fluid path and said return fluid region, said passage means being isolated from fluid communication with said interior of said primary valve member.

* * * * *